US010347036B2

(12) United States Patent
Oldach et al.

(10) Patent No.: US 10,347,036 B2
(45) Date of Patent: Jul. 9, 2019

(54) METHOD AND DEVICE FOR ARRANGING GRAPHICAL DESIGN ELEMENTS ON A SEAT COVER OF A VEHICLE SEAT

(71) Applicant: Adient Luxembourg Holding S.à.r.l., Luxembourg (LU)

(72) Inventors: Sven Oldach, Remscheid (DE); Petra Gries, Wermelskirchen (DE)

(73) Assignee: ADIENT LUXEMBOURG HODLING S.À.R.L., Luxembourg (LU)

( * ) Notice: Subject to any disclaimer, the term of this patent is extended or adjusted under 35 U.S.C. 154(b) by 137 days.

(21) Appl. No.: 15/325,232

(22) PCT Filed: Jul. 10, 2015

(86) PCT No.: PCT/EP2015/065867
§ 371 (c)(1),
(2) Date: Jan. 10, 2017

(87) PCT Pub. No.: WO2016/005575
PCT Pub. Date: Jan. 14, 2016

(65) Prior Publication Data
US 2017/0186217 A1     Jun. 29, 2017

(30) Foreign Application Priority Data

Jul. 11, 2014    (DE) .................. 10 2014 213 559

(51) Int. Cl.
*G06T 17/50*      (2006.01)
*G06T 15/10*      (2011.01)
(Continued)

(52) U.S. Cl.
CPC .......... *G06T 15/10* (2013.01); *G06F 17/5095* (2013.01); *G06T 15/04* (2013.01);
(Continued)

(58) Field of Classification Search
None
See application file for complete search history.

(56) References Cited

U.S. PATENT DOCUMENTS

| 5,107,444 A | 4/1992 | Wu |
| 5,255,352 A | 10/1993 | Falk |

(Continued)

FOREIGN PATENT DOCUMENTS

| DE | 100 63 505 A1 | 7/2002 |
| DE | 10 2006 046 709 A1 | 4/2008 |

(Continued)

OTHER PUBLICATIONS

Argyroulla, A. (2012). Learning Marvelous Designer. [Blog] 3D Digital Design. Available at: http://silver3dart.wordpress.com/2012/24/hello-world/ [Accessed Jul. 19, 2018].*

(Continued)

*Primary Examiner* — Yingchun He
(74) *Attorney, Agent, or Firm* — McGlew and Tuttle, P.C.

(57) ABSTRACT

A method, for arranging graphical design elements on a seat cover (1) of a vehicle seat, includes creating a three-dimensional seat cover model (2) having at least two three-dimensional cut models (2.1.1 to 2.1.7) connected by at least one seam (N) and visualizing the three-dimensional seat cover model (2) by a computer-assisted design tool (CAD) and positioning at least one graphical design element (G) on at least one cut part (1.1.1 to 1.1.7) with a drawing tool (ZW). An image of a graphic design element (G) is displayed on the three-dimensional seat cover model (2) in accordance with a UV transformation (UVT) of a corresponding cut model (2.1.1 to 2.1.7) with a texture display tool (TW) connected to the computer-assisted design tool (CAD).

9 Claims, 8 Drawing Sheets

(51) Int. Cl.
  *G06T 19/00* (2011.01)
  *G06T 15/04* (2011.01)
  *G06F 17/50* (2006.01)
  *B60N 2/58* (2006.01)
(52) U.S. Cl.
  CPC ............ *G06T 19/00* (2013.01); *G06T 19/006* (2013.01); *B60N 2/5891* (2013.01); *G06T 2215/16* (2013.01); *G06T 2219/021* (2013.01)

(56) References Cited

U.S. PATENT DOCUMENTS

| | | | |
|---|---|---|---|
| 6,144,890 A * | 11/2000 | Rothkop | G06F 17/5095 700/182 |
| 8,014,001 B2 | 9/2011 | Trenkenschu | |
| 2001/0026272 A1 | 10/2001 | Feld et al. | |
| 2015/0351477 A1* | 12/2015 | Stahl | G06T 15/04 700/132 |

FOREIGN PATENT DOCUMENTS

| | | |
|---|---|---|
| DE | 10 2012 101 428 A1 | 8/2012 |
| JP | 2000 235589 A | 8/2000 |
| WO | 02/057964 A2 | 7/2002 |
| WO | 2005/051113 A1 | 6/2005 |

OTHER PUBLICATIONS

Igarashi T et al: "Adaptive Unwrapping for Interactive Texture Painting", Proceedings of the 2001 Symposium on Interactive 3D Graphics. Research Triangle Park, NC, Mar. 19-21, 2001; [Proceedings of the Symposium on Interactive 3D Graphics], New York, NY: ACM, US, Mar. 19, 2001 (Mar. 19, 2001), pp. 209-216.

* cited by examiner

METHOD AND DEVICE FOR ARRANGING GRAPHICAL DESIGN ELEMENTS ON A SEAT COVER OF A VEHICLE SEAT

CROSS REFERENCE TO RELATED APPLICATIONS

This application is a United States National Phase Application of International Application PCT/EP2015/065867 filed Jul. 10, 2015 and claims the benefit of priority under 35 U.S.C. § 119 of German Application 10 2014 213 559.1 filed Jul. 11, 2014 the entire contents of which are incorporated herein by reference.

FIELD OF THE INVENTION

The invention relates to a method and to a device for the arrangement of graphical design elements on a seat cover of a vehicle seat.

BACKGROUND OF THE INVENTION

From the prior art, methods are known by way of which design-defining drawings, for example patterns, are transferred to textiles for covering curved and/or deformable surfaces.

DE 100 63 505 A1 has disclosed a method and a device for the construction of a vehicle seat composed of a cushion body and of a cushion cover by way of a data processing system. Here, a cushion cover is developed on the basis of a digitalized setpoint contour of a seat cushion, wherein influences from the upholstering of the seat cushion with the cushion lining are taken into consideration.

DE 10 2012 101 428 A1 describes a method for creating a clothing cutting, in which method the body of a person is scanned for the purposes of generating a three-dimensional body model. On the three-dimensional body model, virtual coordinates for simulating an article of clothing are generated, the relative dimensions of which are mapped into a two-dimensional depiction.

Similarly to DE 10 2012 101 428 A1, DE 10 2006 046 709 A1 discloses a method for producing tailored articles of clothing, wherein a template article of clothing is measured with regard to the dimensions, alterations to the recorded dimensions are performed if necessary, and material, in particular cloth, is selected in accordance with material structure and color, and the production data thus defined are transmitted to a production site, and at the production site, the tailored article of clothing is produced on the basis of the production data.

U.S. Pat. No. 8,014,001 B2 discloses a method for the development of customer-specific seat cushions, in which method a user sits on a test seat, and the resulting deformations in the test seat are frozen and measured after the user has departed from the test seat.

U.S. Pat. No. 5,255,352 discloses a method for designing mathematically defined three-dimensional surfaces, in which design elements are arranged on a surface design image such that they appear in the design desired for the three-dimensional surface. For this purpose, in an intermediate step, the surface design image is mapped onto a two-dimensional surface pattern view of the three-dimensional surface, and is subsequently transferred to the three-dimensional surface.

U.S. Pat. No. 5,107,444 describes a method for mapping of a three-dimensional surface into a two-dimensional surface pattern view. Here, from the three-dimensional surface, a three-dimensional grid is obtained, by means of which surface elements are defined. Such surface elements are depicted in groups on the surface pattern view and are amalgamated there. Points of the surface elements on the surface pattern view are recursively adapted such that errors in the surface pattern view are corrected and an optimum solution is obtained. Tools are provided to the user to determine the correctness of the surface pattern view. For further improvement, the user can modify the surface pattern view, for example by adding of darts.

U.S. Pat. No. 6,144,890 has disclosed a design method for a cushion part, for example a vehicle seat, by way of which method templates for the replication of lining material and filler material are generated from an adapted data model in order to create prototypes of a cushion part in relatively short development cycles. The data model may comprise inter alia data relating to the frame, to the vehicle, to ergonomic boundary conditions, to packaging requirements, to lining materials and/or to restraint systems. By way of a graphical display device, depictions of a vehicle seat, for example photorealistic, high-resolution depictions of numerous aspects of its final appearance, are displayed. These include depictions of the fabric structure, of the surface structure of plastics parts, of constrictions and/or of seam forms.

SUMMARY OF THE INVENTION

It is an object of the present invention to specify an improved method and an improved device for the arrangement of graphical design elements on a seat cover of a vehicle seat.

The method according to the invention for the arrangement of graphical design elements on a seat cover of a vehicle seat provides that a three-dimensional seat cover model of a two-dimensional seat cover of a real vehicle seat is determined and said seat cover model is mapped by way of a UV transformation into a two-dimensional cutting model pattern view in which two-dimensional design elements are created, wherein the created design elements are additionally output in the three-dimensional seat cover model. By way of such 3D modeling of a seat cover, for example 3D acquisition, such as scanning, and mapping of said 3D model onto a 2D plane and application of 2D design elements, such as patterns, with corresponding distortion in the 2D plane of the seat cover and outputting of the 2D design elements in the 3D model of the seat cover, the design elements are trimmable, in particular adaptable, to the real seat cover, or conversely, the seat cover is trimmable, in particular adaptable, in relation to the design elements. In particular, the design elements are capable of being output, for example visualized, and correctly positioned, in particular adapted in terms of their position, relative to the seat cover. A further embodiment provides that the seat cover is correctly positioned, in particular adapted in terms of its position, relative to the design elements.

In detail, in one possible embodiment, the method comprises:

in a first method step, the creation of a three-dimensional seat cover model with at least two three-dimensional cutting models connected by way of at least one seam, and the visualization of the three-dimensional seat cover model by way of a computer-aided design tool, in a second method step, the arrangement of cutting parts, which correspond to the at least two cutting models, in at least one cutting drawing area which is displayed in a predetermined display form on a cutting drawing area output region of an output unit by way of a drawing tool, in a third method step, the creation of at least one UV transformation for the mapping of three-dimensional model point coordinates of a cutting model onto two-dimensional cutting drawing area point coordinates of a cutting model pattern view which, in the pattern outer contour, substantially coincides with the cutting part outer contour of the corresponding cutting part, in a fourth method step, the assignment of at least one cutting drawing area output region to the display of textures on the three-dimensional seat cover model by way of a texture display tool, which is connected to the computer-aided design tool, and in a fifth method step, the positioning of at least one graphical design element by way of the drawing tool on at least one cutting part, wherein, by way of the texture display tool connected to the computer-aided design tool, a depiction of the graphical design element in accordance with the UV transformation of the corresponding cutting model is displayed on the three-dimensional seat cover model.

By way of the UV transformation for the mapping of three-dimensional model point coordinates of a cutting model onto two-dimensional cutting drawing area point coordinates of a cutting model pattern view which, in the outer contour, substantially coincides with the outer contour of the corresponding cutting part, it is advantageously possible to produce geometrical correspondence in the manner of a coordinate transformation between a cutting part and a three-dimensional seat cover model. It is thus possible for the appearance of a design element, for example of a texture or of an ornament, on a seat cover fitted on a vehicle seat to be depicted in an accurate or realistic manner. It is thus also possible for design elements to be designed and arranged in accordance with a desired appearance and a desired effect. In particular, it is possible for design elements extending over multiple cover parts of a seat cover to be arranged on cutting parts such that a distortion and/or an offset of the design element at boundaries of the cover parts and/or at seams by way of which cutting parts are connected to form a cover part is avoided or at least minimized. In relation to methods according to the prior art, the manufacture of physical seat covers on a trial and error basis with physical cutting parts provided with design elements is eliminated, thus saving costs and working time.

In one embodiment of the method according to the invention, a three-dimensional seat cover model is created at least partially by sampling of the surface of a vehicle seat lined with a seat cover and of the seam incorporated in said seat cover and is subsequently divided up along the seam into three-dimensional cutting models. It is for example possible for this purpose to use a physically available vehicle seat (actual vehicle seat) without plastics panels. In this way, the form of a three-dimensional seat cover model, and the exact position of seams and thus also of cutting parts which are connected by way of seams to form a cover part, are advantageously determined with high accuracy on an existing vehicle seat (actual vehicle seat). In relation to the use of, for example, a three-dimensional surface data set from a computer-aided design process (CAD process), this embodiment of the invention offers the advantage of much more accurate correlation with the physical model.

In one embodiment of the method according to the invention, in the third method step, in a first sub-step, for at least one three-dimensional cutting model, a first two-dimensional cutting model pattern view is created by way of a UV transformation, in a second sub-step, the pattern outer contour of the cutting model pattern view is adapted to the cutting part outer contour of the corresponding cutting part by displacement of at least one marking point, and in a third sub-step, the parameters of the UV transformation and thus the pattern outer contour of the cutting model pattern view are adapted to the displacement of the at least one marking point.

The second and third sub-steps are repeated until the deviation of the pattern outer contours of the cutting model pattern view from the cutting part outer contour of the cutting part falls below a predetermined deviation value.

Thereafter, in a fourth sub-step, visible sewing markings on cutting parts on both sides of a connecting seam are brought approximately into alignment along an alignment direction perpendicular to the seam direction.

It is advantageously the case that, through the alignment of the sewing markings on adjacent cutting parts which are connected by way of a seam, the individual UV transformations for said cutting parts are coordinated or adapted such that, along a seam, oppositely situated cutting drawing area points on both cutting parts are also mapped onto at least approximately oppositely situated model points on the seat cover model. Thus, an offset of design elements, which extend over multiple cutting parts, along connecting seams are avoided.

In one embodiment of the method, the seat cover comprises, as cover parts, an inner backrest cover, a seat cushion cover, an outer backrest cover and a headrest cover, wherein the cutting parts assigned to a cover part are arranged on a cutting drawing area.

In one embodiment of the method, a cutting part is mapped onto a cutting drawing area on a mapping scale of 1:1. Here, it is possible for at least one cutting drawing area to be square with an edge length of 4096 pixels. It is thus particularly advantageously possible to perform detailed design work, while at the same time an overview of the designed cutting parts of a cover part and/or of a seat cover is maintained.

In one embodiment of the method, cutting parts are arranged symmetrically on a cutting drawing area. This advantageously permits easier and faster design work in the application of design elements to cutting parts.

The device according to the invention for the arrangement of graphical design elements on a seat cover of a vehicle seat comprises a processing unit and a first and a second display device which are connected to the processing unit, wherein the processing unit is, by way of at least one data processing program, formed as a computer-aided design tool, as a drawing tool and as a texture display tool, and wherein the visualization of the three-dimensional seat cover model is performed on the first display device, and the at least one cutting drawing area output region is arranged on the second display device.

With the two display devices, it is advantageously for example possible, for graphical design elements to be applied to cutting parts and to be visualized on the second display device, and it is simultaneously instantaneously possible, in particular without a changeover to a different data processing program, for the arrangement and the design effect of the design elements on the three-dimensional seat cover model to be followed and evaluated on the first display device.

Further details and exemplary embodiments of the invention will be discussed in more detail below on the basis of drawings.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
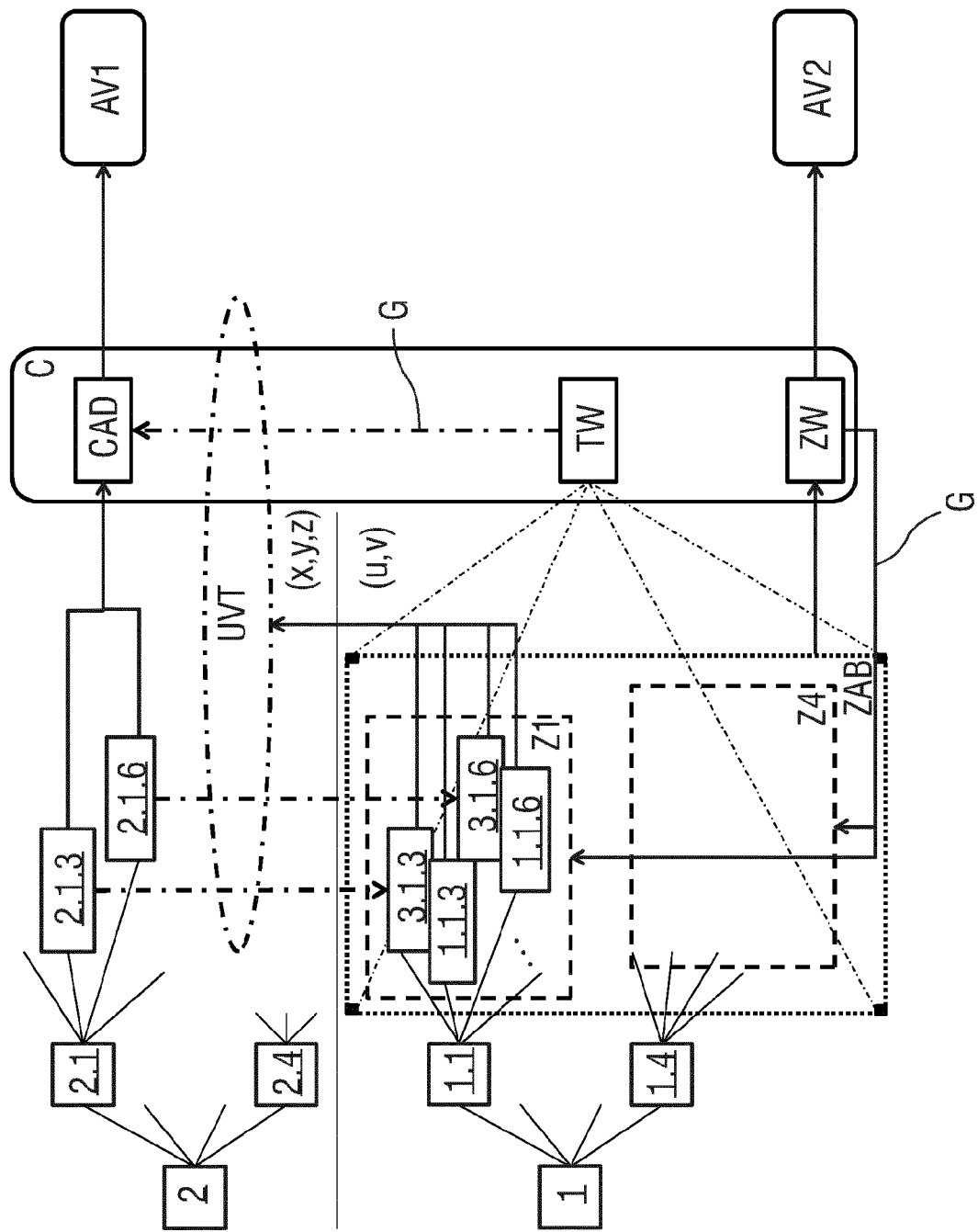
FIG. 1 is a schematic overview of the method and of the tools and coordinate systems used in the method.

Referring to the drawings, FIG. 1 explains the sequence of the method in the form of an overview. A seat cover 1 (actual seat cover) comprises cover parts 1.1 to 1.4 (actual cover parts). Each cover part 1.1 to 1.4 comprises at least one cutting part 1.1.1 to 1.1.7 (actual cutting part), which cutting parts are displayable in a two-dimensional, planar UV coordinate system (u, v). In FIG. 1, by way of example, only two cutting parts 1.1.3, 1.1.6 of the cover part 1.1 are schematically illustrated.

From a seat cover 1 fitted on a real vehicle seat, a for example three-dimensional seat cover model 2 is determinable, for example scannable or derivable from a photograph, in a three-dimensional spatial model or XYZ coordinate system (x, y, z). The determined three-dimensional seat cover model 2 may in this case comprise multiple three-dimensional cover part models 2.1 to 2.4, which correspond in particular to the fitted cover parts 1.1 to 1.4. Each three-dimensional cover part model 2.1 to 2.4 may in turn be formed from three-dimensional cutting models 2.1.1 to 2.1.7, correspondingly to the two-dimensional cutting parts 1.1.1 to 1.1.7, wherein, by way of example, only two cutting models 2.1.3, 2.1.6 are illustrated.

The processing of the determined three-dimensional seat cover model 2 and of its components (three-dimensional cover part models 2.1 to 2.4 and cutting models 2.1.1 to 2.1.7) may be performed by way of a CAD tool CAD for computer-aided design (CAD, design tool). By way of the CAD tool, the three-dimensional seat cover model 2 may furthermore be visualized on a first display device AV1.

By way of a so-called coordinate transformation, referred to as UV generation or UV transformation UVT (geometric modeling method, UV mapping for producing a 2D image which represents a 3D model), there is generated for each three-dimensional cutting model 2.1.3, 2.1.6 a two-dimensional cutting model pattern view 3.1.3, 3.1.6, which are illustrated by way of example for the cutting models 2.1.3, 2.1.6.

Both the cutting parts 1.1.3, 1.1.6 and the cutting model pattern views 3.1.3, 3.1.6 are displayed in a cutting drawing area output region ZAB. The cutting drawing area output region ZAB advantageously comprises disjoint cutting drawing areas Z1, Z4, which in each case accommodate both the cutting parts 1.1.3, 1.1.6 of a cover part 1.1 to 1.4 and the cutting model pattern views 3.1.3, 3.1.6 of a cover part model 2.1 to 2.4 corresponding thereto. Thus, the shape and size of cutting parts 1.1.3, 1.1.6 according to an original cutting design become similar to distorted, for example stretched, cutting model pattern views 3.1.3, 3.1.6 which correspond to the shape and size of a cutting part 1.1.3, 1.1.6 fitted onto a vehicle seat.

Furthermore, outer contours 1.1.3.A, 1.1.6.A of cutting parts 1.1.3, 1.1.6 are compared with outer contours 3.1.3.A, 3.1.6.A of cutting model pattern views 3.1.3, 3.1.6 in the UV coordinate system, and are adapted as necessary until a predetermined amount of overlap between the cutting parts 1.1.3, 1.1.6 and corresponding cutting model pattern views 3.1.3, 3.1.6 has been achieved.

By way of a drawing tool ZW, it is furthermore possible for design elements G, for example patterns or textures, to be applied to cutting drawing areas Z1, Z4 or parts thereof in the UV coordinate system. By way of a drawing tool ZW of said type, it is furthermore possible for the cutting drawing area output region ZAB to be at least partially output on a second display device AV2.

By way of a texture display tool TW, it is possible for such design elements G created in the UV coordinate system (u, v) and situated within the predetermined cutting drawing area output region ZAB to be transferred to the CAD tool CAD and, in accordance with the determined UV transformation UVT, to be displayed in the visualization of the three-dimensional seat cover model 2 correctly, that is to say taking into consideration for example local distortions on cover parts 1.1 to 1.4 during the fitting of a seat cover 1 onto a vehicle seat. It is thus possible for the appearance of such design elements G on a lined actual vehicle seat to be evaluated and optimized.

The CAD tool CAD, the texture display tool TW and the drawing tool ZW are for example implemented as programs on a common processing unit C, and are executed on said processing unit. However, embodiments of a device are also possible in which the execution of at least one of said tools is performed on a further processing unit which is not illustrated here. Embodiments are likewise possible in which the visualization of the seat cover model 2 and the display of the cutting drawing area output region ZAB are performed jointly on a single display device AV1, AV2.

Details of the method and of the device will be discussed in more detail below on the basis of FIGS. 2 to 7.

Figure 2:
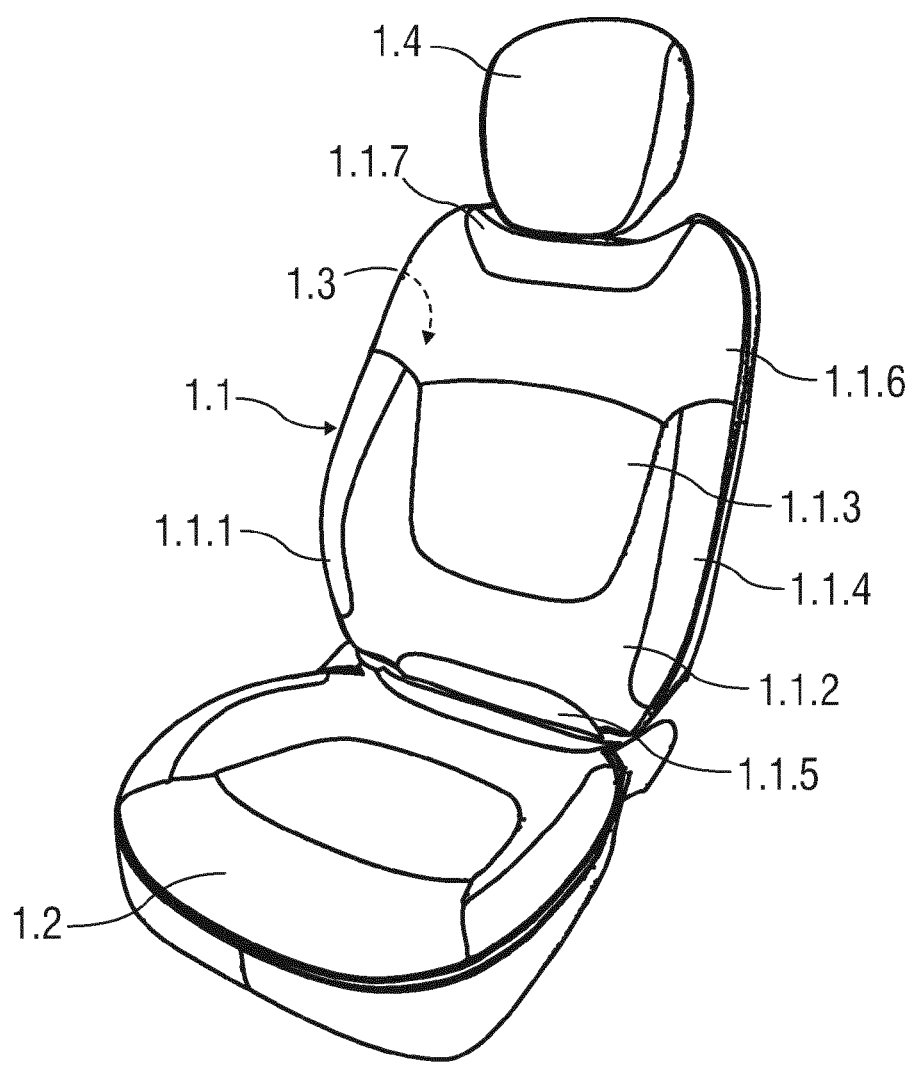
FIG. 2 is a schematic view showing a vehicle seat, in the form of a front seat, with a seat cover.

FIG. 2 schematically shows a vehicle seat in the form of a front seat with a seat cover 1. The seat cover 1 comprises, as cover parts 1.1 to 1.4, an inner backrest cover 1.1 facing toward the seat surface, a seat cushion cover 1.2, an outer backrest cover 1.3 pointing away from the seat surface, and a headrest cover 1.4. It is possible for a seat cover 1 for a vehicle seat 1 to have other and/or further cover parts in other embodiments, for example a seat cover 1 for a vehicle seat in the form of a rear seat or rear-seat bench.

Figure 3:
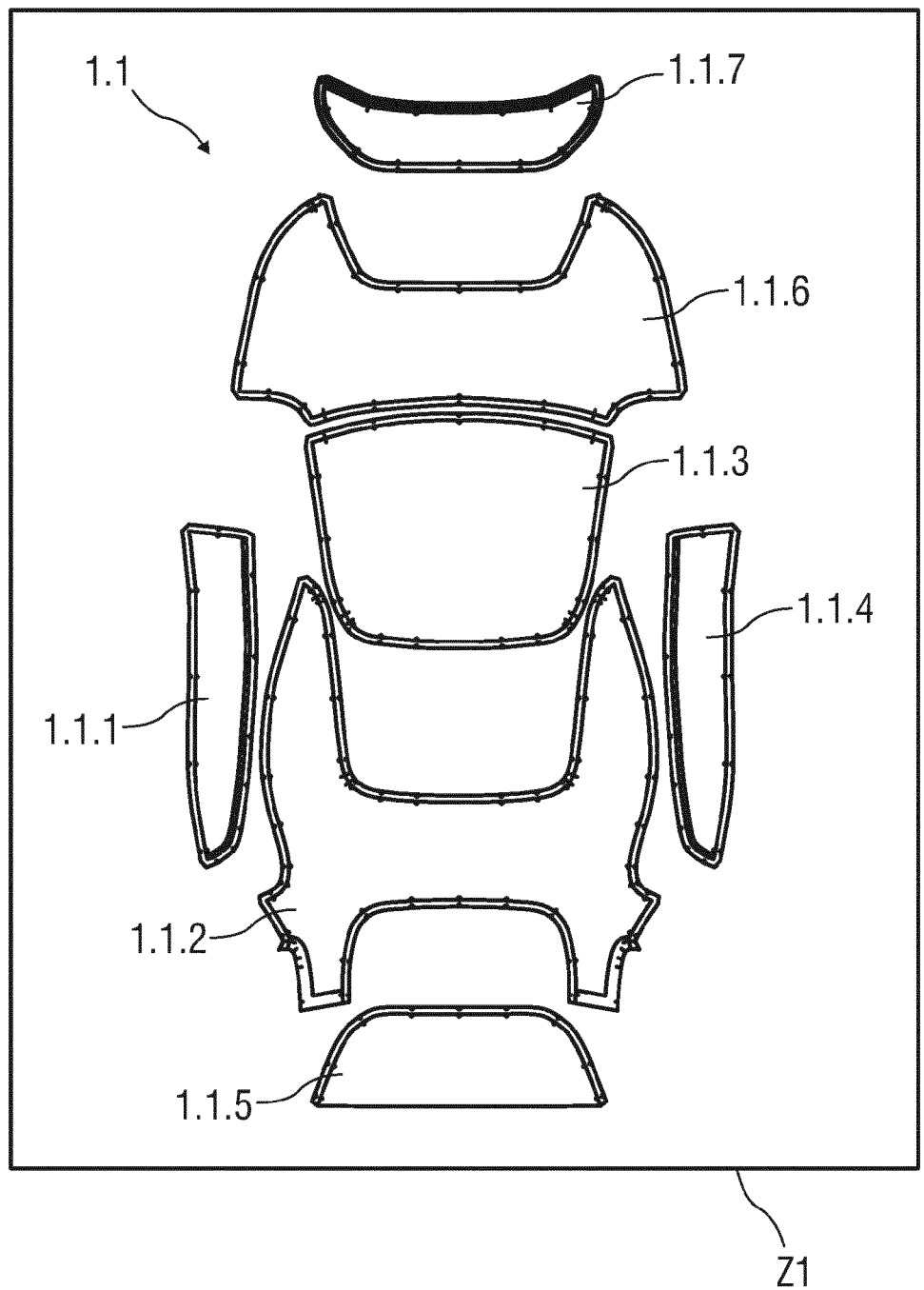
FIG. 3 is a schematic view showing the arrangement of cutting parts for a cover part for a seat cover of said type.

As illustrated by way of example in the case of the inner backrest cover 1.1, a cover part 1.1 to 1.4 is manufacturable from multiple two-dimensional cutting parts 1.1.1 to 1.1.7, which cutting parts are connected to one another by way of seams N. FIG. 3 schematically shows the arrangement of such cutting parts 1.1.1 to 1.1.7 on a first cutting drawing area Z1, Z4 for the inner backrest cover 1.1, wherein individual cutting parts 1.1.1 to 1.1.7 are depicted in divided form, that is to say without connecting seams N. Further cutting drawing areas are assigned to the seat cushion cover 1.2, to the outer backrest cover 1.3 and to the headrest cover 1.4, and comprise the cutting parts of the respective cover parts 1.1 to 1.4 in a divided depiction. The geometry and the dimensions of the respectively illustrated cutting parts 1.1.1 to 1.1.7 emerge from a three-dimensional surface dataset which is normally based on the mapping of a vehicle seat according to the prior art, for example the mapping by way of a computer-aided design (CAD) tool CAD.

Figure 4:
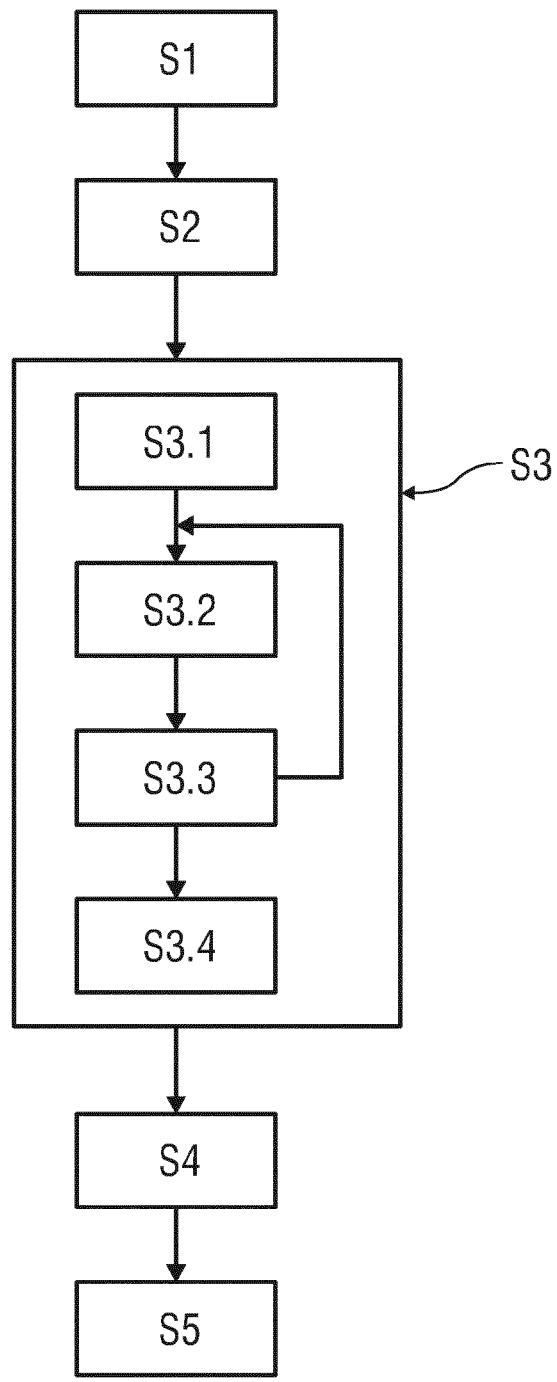
FIG. 4 is a schematic view showing the sequence of a method for the creation of a design-defining drawing with design elements for a seat cover of said type.

FIG. 4 schematically shows the sequence of the method according to the invention. In a first method step S1, surface points of the surface of a vehicle seat lined with a seat cover 1 are determined by digitalization of a series-produced physical model or of a prototype of the vehicle seat 1. Here, the position and the profile of the seams N illustrated in more detail in FIG. 5a are also determined.

The topography of the surface of the seat 1 is advantageously determined with an accuracy of approximately +/−1 mm in a sampling direction perpendicular to the surface of the seat cover 1.

Figure 5A:
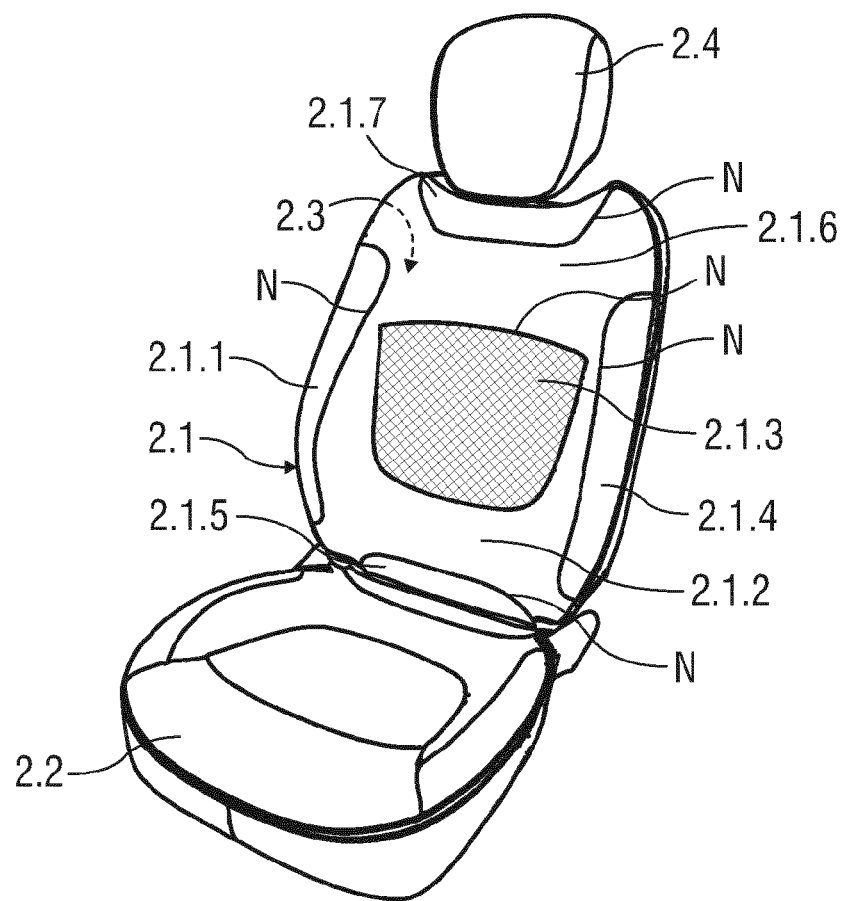
FIG. 5a is a schematic view showing a three-dimensional seat cover model composed of three-dimensional cutting models.
Figure 5A:
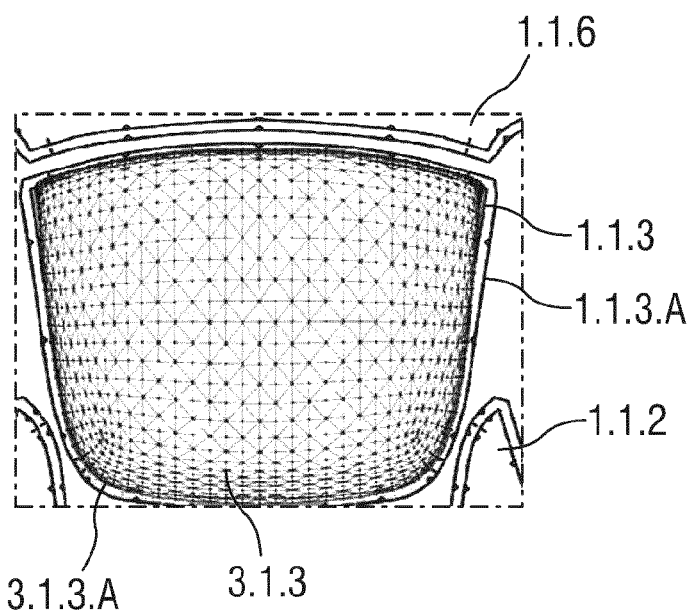

From the surface points obtained by way of sampling, a closed three-dimensional seat cover model 2 composed of cover part models 2.1 to 2.4 corresponding to the cover parts 1.1 to 1.4 is created, wherein a cover part model 2.1 to 2.4 is divided along the profiles of the seams N into three-dimensional cutting models 2.1.1 to 2.1.7, as illustrated in more detail in FIG. 5a. Since the division of the closed three-dimensional seat cover model 2 is performed along the same seams N as the division of the cover parts 1.1 to 1.4 into cutting parts 1.1.1 to 1.1.7, it is the case here that each three-dimensional cutting model 2.1.1 to 2.1.7 corresponds to exactly one two-dimensional cutting part 1.1.1 to 1.1.7.

In a second method step S2, cutting drawing areas Z1, Z4 are stored in a working file which describes the arrangement of the cutting drawing areas Z1, Z4 in a predetermined display form. Each of the cutting drawing areas Z1, Z4 comprises a two-dimensional depiction of the cutting parts of the cover part 1.1 to 1.4 assigned to the respective cutting drawing area Z1, Z4. In the predetermined display form, a cutting drawing area Z1, Z4 is assigned to in each case one cover part 1.1 to 1.4 and is dimensioned such that in each case all of the cutting parts 1.1.1 to 1.1.7 assigned to said cover part 1.1 to 1.4 are displayable on the cutting drawing area Z1, Z4 on a mapping scale of 1:1. For example, the cutting drawing area Z1, Z4 is dimensioned such that all cutting parts 1.1.1 to 1.1.7 is displayable on a mapping scale of 1:1. In one embodiment of the invention, the cutting parts 1.1.1 to 1.1.7 are depicted, in accordance with the predetermined display form, in a symmetrical arrangement entirely on the cutting drawing area Z1, Z4. Optimum design work is thus advantageously possible. A further advantage of such a predetermined display form according to this embodiment of the invention is that, with this, the generation and display of for example square texture patterns, which comprise color information relating to a red, a green and a blue color channel, is made possible, which texture patterns are capable of being interactively mapped onto the corresponding three-dimensional cutting model in a subsequent fifth method step S5.

From the cutting parts 1.1.1 to 1.1.7 displayed in a cutting drawing area Z1, Z4, square reference textures with a fixedly predefined edge length are derived. The fixedly predefined edge length is selected such that it comprises 4096 pixels in a display on a mapping scale of 1:1 on a monitor.

In a third method step S3, the three-dimensional cutting models 2.1.1 to 2.1.7 are linked to the two-dimensional cutting parts 1.1.1 to 1.1.7 arranged on cutting drawing areas Z1, Z4 by way of a UV transformation UVT or UV generation. A UV transformation UVT is in this case to be understood to mean a mapping rule by which, for every point in a three-dimensional cutting model 2.1.1 to 2.1.7, exactly one corresponding point in an associated two-dimensional cutting part 1.1.1 to 1.1.7 is defined. Such UV generation assigns to each model point, defined by way of three coordinates in a model or XYZ coordinate system (x, y, z), one cutting drawing area point, defined by way of two coordinates in a cutting drawing area or UV coordinate system (u, v). A display of a three-dimensional seat cover model 2 composed of cutting models 2.1.1 to 2.1.7 and of a two-dimensional drawing also referred to as cutting model pattern view 3.1.3, 3.1.6 is thus possible. By way of such a UV transformation UVT, a three-dimensional cutting model 2.1.3, 2.1.6 in the XYZ coordinate system (x, y, z) is mapped onto a corresponding two-dimensional cutting model pattern view 3.1.3, 3.1.6 in the UV coordinate system (u, v).

From the prior art, methods for the determination and parameterization of UV transformations are known with which a regular, for example grid-like arrangement of model points is transformed into a likewise as far as possible regular, for example only slightly distorted, likewise grid-like arrangement of cutting drawing area points.

Each three-dimensional cutting model 2 is assigned the corresponding reference texture created in the second method step S2, and is thus visible in the display of the three-dimensional cutting model 2. Through the application of the UV transformation UVT to said assigned reference texture, said reference texture is likewise visible in the two-dimensional cutting model pattern view in the UV coordinate system (u, v). It is thus advantageously possible for the outer contour of a three-dimensional cutting model 2.1.1 to 2.1.7 to be determined. Such a pattern outer contour 3.1.3.A, 3.1.6.A is obtained if the surface of a corresponding cutting model 2.1.3, 2.1.6 is propagated or developed onto a planar plane with minimal deformation. With the aid of a reference texture, it is possible for corresponding points to be mapped onto a cutting part 1.1.1 to 1.1.7 and onto the associated cutting model 2.1.1 to 2.1.7. It is thus advantageously possible for selected points of the reference texture to be used as a marking point M for the adaptation of the UV transformation UVT, as is also described in more detail in FIG. 5b.

According to the invention, a UV transformation UVT determined by way of a method of said type known from the prior art is used in a first sub-step S3.1 of the third method step for the generation of a first two-dimensional cutting model pattern view 3.1.3, 3.1.6 for each three-dimensional cutting model 2.1.1 to 2.1.7. Depending on the geometry of the three-dimensional cutting model 2.1.3, 2.1.6, said first two-dimensional cutting model pattern view 3.1.3, 3.1.6 is generally similar but not congruent with the cutting part 1.1.3, 1.1.6 corresponding to the cutting model 2.1.3, 2.1.6. FIG. 5a shows this in more detail on the basis of the example of the cutting model pattern views 3.1.3, 3.1.6 which are assigned to the cutting models 2.1.3, 2.1.6 as part of the inner backrest cover model 2.1.

According to the invention, in a second sub-step S3.2 of the third method step, the first cutting model pattern view 3.1.3, 3.1.6 is modified such that an improved, for example more accurate, overlap with the corresponding cutting part

1.1.3, 1.1.6 is achieved. For example, it is possible for a marking point M situated close to the pattern outer boundary 3.1.3.A of the cutting model pattern view 3.1.3 to be displaced onto the cutting part outer boundary 1.1.3.A of the corresponding cutting part 1.1.3, as shown in more detail in FIG. 5b. Such a marking point M is in this case advantageously displaced onto the cutting part outer boundary 1.1.3.A of the corresponding cutting part 1.1.3 substantially perpendicularly to the tangent closest to the marking point M.

Also known from the prior art are restricted methods for the determination and parameterization of UV transformations, in which a regular, for example grid-like arrangement of model points is transformed into a likewise as far as possible regular, for example only slightly distorted, likewise grid-like arrangement of cutting drawing area points, wherein at least one predetermined model point is mapped exactly onto at least one corresponding predetermined cutting drawing area point.

According to the invention, a UV transformation that has been determined by way of such a restricted method known from the prior art is used in a third sub-step S3.3 of the third method step for the generation of a second two-dimensional cutting model pattern view 3.1.3, 3.1.6 in each case for the corresponding three-dimensional cutting model 2.1.3, 2.1.6. Depending on the geometry of the three-dimensional cutting model 2.1.3, 2.1.6, said second two-dimensional cutting model pattern view 3.1.3, 3.1.6 generally has a greater overlap with the cutting part 1.1.3, 1.1.6 corresponding to the cutting model 2.1.3, 2.1.6.

Through iterative repetition of the second and third sub-steps S3.2, S3.3 of the third method step, further cutting model pattern views 3.1.3, 3.1.6, that is to say a third, fourth etc. cutting model pattern view, are capable of being generated, which in the pattern outer contour 3.1.3.A, 3.1.6.A have an always relatively small deviation from the cutting part outer contour 1.1.3.A, 1.1.6.A of the corresponding cutting part 1.1.3, 1.1.6. If the deviation between the outer contours of the cutting model pattern view 3.1.3, 3.1.6 and of the corresponding cutting part 1.1.3, 1.1.6 lies below a predefined tolerance, for example below the manufacturing tolerance during the sewing of the cutting parts 1.1.1 to 1.1.7 to form a cover part 1.1 to 1.4, the sequence of iterative repetitions of the second and third sub-steps S3.2, S3.3 of the third method step can be terminated.

Figure 6:
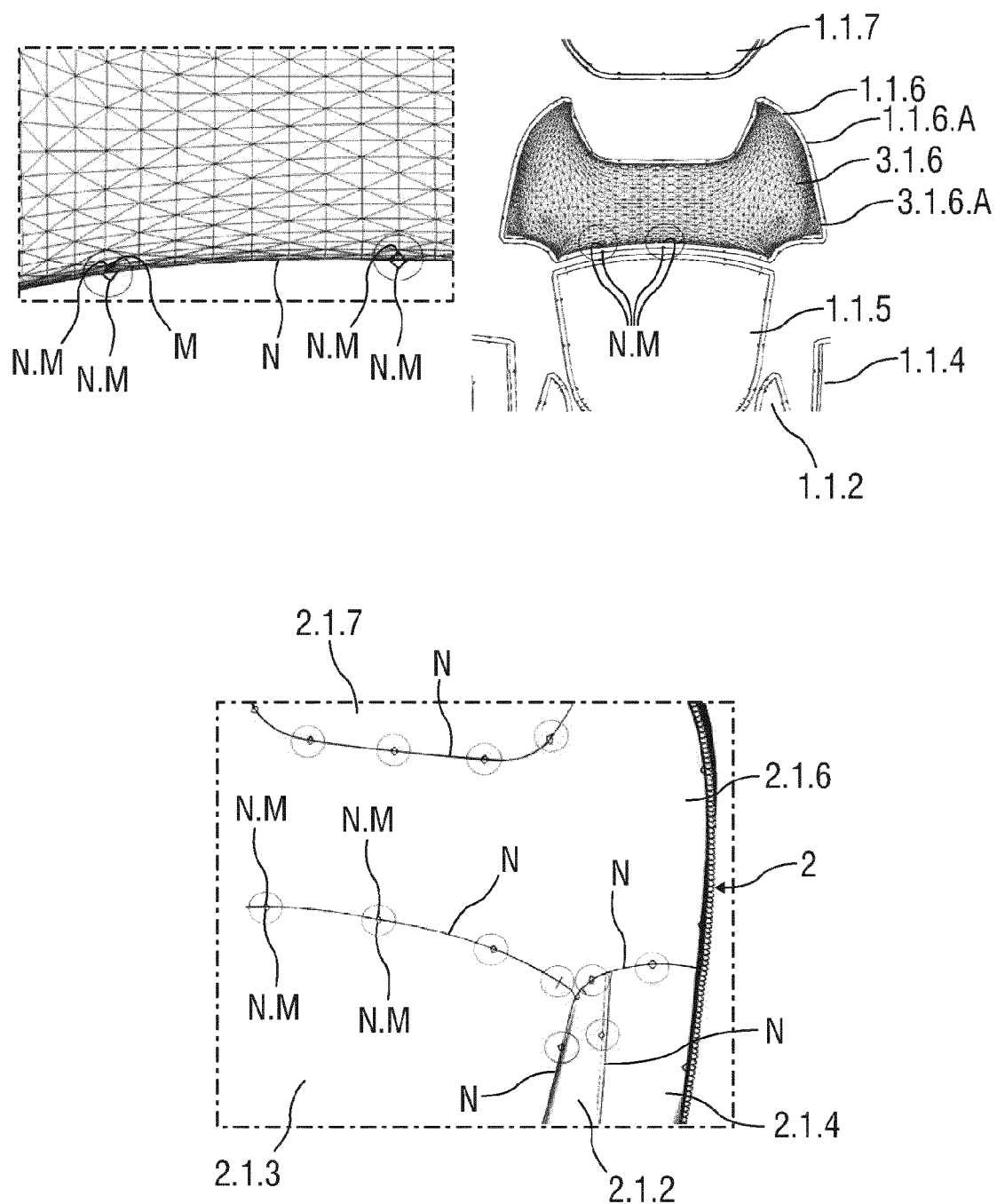
FIG. 6 is a schematic view showing the arrangement and orientation of sewing markings.

In a subsequent fourth sub-step S3.4 of the third method step, visible sewing markings N.M, which are applied to cutting parts 1.1.1 to 1.1.7 oppositely on both sides of a connecting seam N, are brought into overlap, as illustrated in more detail in FIG. 6. For this purpose, marking points M which are situated on or close to oppositely situated visible sewing markings N.M on both sides of a seam N which connects two cutting models 2.1.1 to 2.1.7 are, in the cutting model pattern views 3.1.3, 3.1.6 of said cutting models 2.1.1 to 2.1.7, displaced such that the visible sewing markings N.M are approximately in alignment in a direction perpendicular to the seam direction, wherein the displacement performed overall at all marking points M should be as small as possible.

The orientation of visible sewing markings N.M is advantageously commenced on cutting models 2.1.1 to 2.1.7 which are as flat as possible and which have the least possible three-dimensional arching, and this is subsequently continued in stepwise fashion for oppositely situated cutting models 2.1.1 to 2.1.7 with increasing arching.

As a result of the third method step S3, therefore, a final UV transformation UVT (UV generation) is determined which generates for each three-dimensional cutting model 2.1.1 to 2.1.7 a final cutting model pattern view 3.1.3, 3.1.6, wherein said final cutting model pattern view 3.1.3, 3.1.6 overlaps the corresponding three-dimensional cutting model 2.1.1 to 2.1.7 with the least possible deviation and, at the same time, in the outer contour 3.1.3.A, 3.1.6.A, coincides with the outer contour 1.1.3.A, 3.1.3.A of the corresponding cutting part 1.1.1 to 1.1.7 within a predetermined tolerance, and wherein visible sewing markings N.M, in the case of three-dimensional cutting models 2.1.1 to 2.1.7 connected by way of a seam N, are approximately in alignment in a direction perpendicular to the seam direction.

In a fourth method step S4, the two-dimensional display of a cutting part 1.1.1 to 1.1.7 arranged on a cutting drawing area Z1, Z4 is linked, by way of the final UV transformation UVT determined in the third method step S3 for said cutting part 1.1.1 to 1.1.7, to the three-dimensional display of the corresponding three-dimensional cutting model 2.1.1 to 2.1.7. From the prior art, texture display tools TW are known by way of which a rectangular monitor region, defined for example by way of pixel coordinates, is selectable for a superposition onto a three-dimensional illustrated surface, for example a surface of a three-dimensional cutting model 2.1.1 to 2.1.7. A pattern or some other graphical display in said monitor region is transferred as a texture to a three-dimensional display of a three-dimensional model, if a final UV transformation UVT has been determined which imparts a correspondence between at least one section of said monitor region and the three-dimensional cutting model 2.1.1 to 2.1.7. For example, it is possible for coordinates of the corner pixels of a cutting drawing area Z1, Z4 to be selected and to be transferred to a texture display tool TW of said type known from the prior art, wherein the cutting drawing area Z1, Z4 comprises for example cutting parts of an inner backrest cover 1.1.

By way of a texture display tool TW of said type, it is then possible, on the displays depicted on the cutting drawing area Z1, Z4, for a pattern or a graphic, for example, to be mapped onto the surface of those three-dimensional cutting models 2.1.1 to 2.1.7 which correspond to the cutting parts 1.1.1 to 1.1.7 displayed on the cutting drawing area Z1, Z4. For example, it is possible in this way for the surface of a three-dimensionally displayed cutting model 2.1.1 to 2.1.7 for the inner backrest cover 1.1 to be provided with patterns which have been drawn onto the corresponding two-dimensional cutting parts 1.1.1 to 1.1.7 arranged in the cutting drawing area Z1, Z4. Here, it is advantageously the case that, through the use of the predetermined UV generations which, by way of the cutting model pattern view 3.1.3, 3.1.6, in each case approximately describe the correspondence between a three-dimensional cutting model 2.1.3, 2.1.6 and an associated two-dimensional cutting part 1.1.3, 1.1.6, a realistic deformation of the two-dimensionally drawn pattern on the three-dimensional cutting model 2.1.3, 2.1.6 is achieved.

Analogously, it is possible for further cutting drawing areas to be selected by way of a texture display tool TW of said type for the display of patterns or graphics on the surfaces of three-dimensional cutting models 2.1.1 to 2.1.7, which patterns or graphics are applied by way of the cutting parts 1.1.1 to 1.1.7 assigned to said further cutting drawing areas.

The size, number and arrangement of such cutting drawing areas Z1, Z4 may in this case be selected as desired and adapted to the requirements of a specific working sequence in the design of seat covers 1.

In a fifth method step S5, design-defining drawings, for example graphical design elements G in the form of patterns or ornaments, are applied to the two-dimensional cutting parts 1.1.1 to 1.1.7 displayed in the at least one cutting drawing area Z1, Z4. By way of the set-up texture display tool TW, said design-defining drawings are displayed as a surface of the associated three-dimensional cutting models 2.1.1 to 2.1.7. Checking of the correct orientation and position and of the proportionality of all design elements G applied to the two-dimensional cutting parts 1.1.1 to 1.1.7 is thus advantageously possible. It is thus possible for time-consuming and material-intensive correction of such applied design elements G, which according to the prior art necessitates the physical manufacture of a seat cover 1 and the fitting thereof on a vehicle seat, to be eliminated.

FIG. 5a schematically shows the division of a three-dimensional seat cover model 2, which has been obtained by way of digitalization from a series-produced physical model or from a prototype of the vehicle seat 1, into three-dimensional cover part models 2.1 to 2.4. Each cover part model is assigned to a cover part 1.1 to 1.4. A cover part model 2.1 to 2.4 is divided, along the seams N which are likewise determined during the digitalization, into three-dimensional cutting models 2.1.1 to 2.1.7, as illustrated by way of example on the basis of the example of the inner backrest cover model 2.1.

In the sub-step S3.1 of the third method step S3, for a three-dimensional cutting model 2.1.1 to 2.1.7, a two-dimensional cutting model pattern view 3.1.3, 3.1.6 is generated, the three-dimensional model point coordinates (XYZ coordinates) are mapped onto two-dimensional cutting drawing area point coordinates (UV coordinates). This is shown by way of example for a central backrest cutting model 2.1.3 arranged centrally on the backrest cover model 2.1.

The application of a seat cover 1 to a vehicle seat generally results, depending on the curvature of the vehicle seat, in local differences in the stretching of the seat cover cloth, which are not known during the application of the UV transformation UVT and which are therefore not taken into consideration. Owing to these differences, the cutting model pattern view 3.1.3, 3.1.6 obtained from the UV transformation (UV generation) UVT generally does not correspond exactly to the corresponding cutting part 1.1.1 to 1.1.7. For example, the pattern outer contour 3.1.3.A of the cutting model pattern view 3.1.3 of the central backrest cutting model 2.1.3 deviates from the cutting outer contour 1.1.3.A of the corresponding cutting part 1.1.3.

Figure 5B:
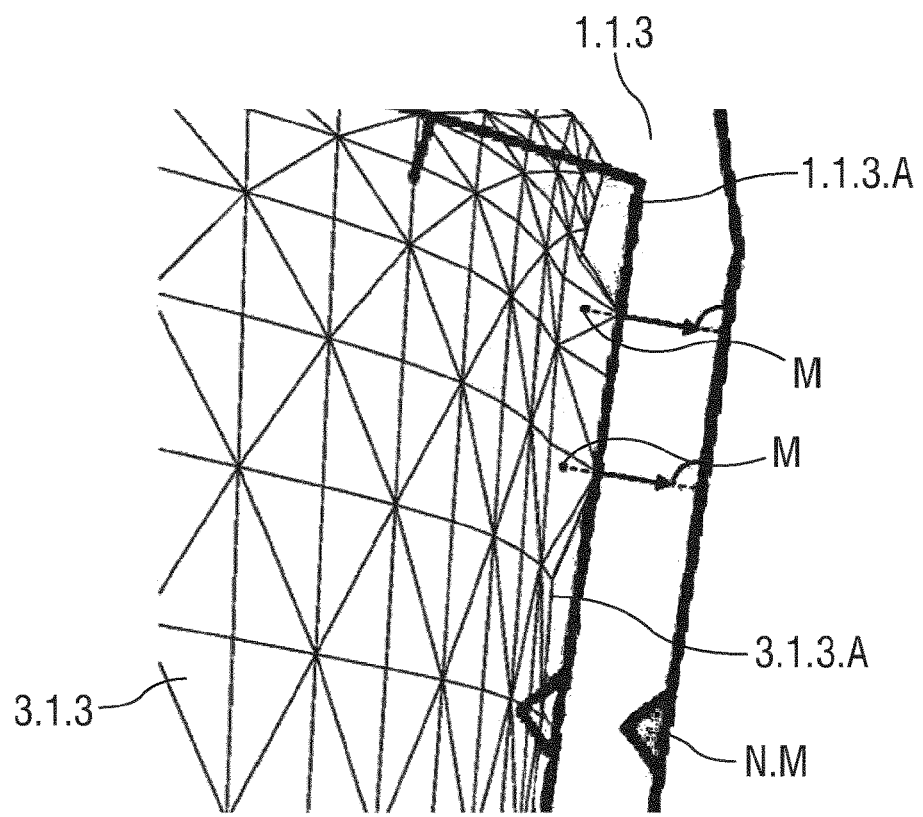
FIG. 5b is two-dimensional cutting model pattern views obtained therefrom, with associated cutting parts.
Figure 5B:
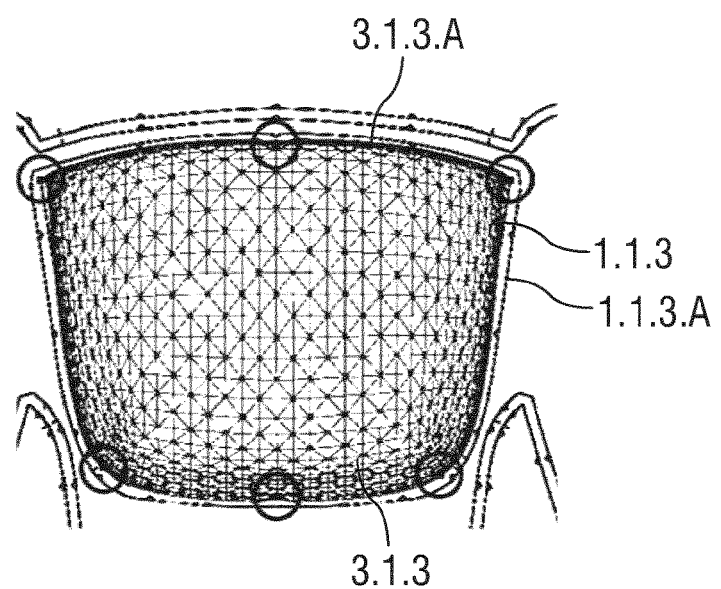

As illustrated in more detail in FIG. 5b, it is the case in the second sub-step S3.2 of the third method step S3 that a marking point M situated close to the outer boundary 3.1.3.A of the cutting model pattern view 3.1.3 is displaced onto the outer boundary 1.1.3.A of the corresponding cutting part 1.1.3. It is particularly advantageous for a marking point M of said type to be displaced substantially perpendicularly to the closest tangent to the cutting part outer contour 1.1.3.A of the corresponding cutting part 1.1.3 in order to achieve an overlap of the outer contours 1.1.3.A, 3.1.3.A of the cutting model pattern view 3.1.3 and of the corresponding cutting part 1.1.3 with the shortest possible displacement travel of the marking point M and, correspondingly, the least possible distortion of the cutting model pattern view 3.1.3. It is possible for multiple marking points M to be defined at various positions on the outer contour 3.1.3.A, 3.1.6.A of a cutting model pattern view 3.1.3, 3.1.6 and to be displaced along a displacement travel, which is in each case as short as possible, onto the respective cutting part outer contour 1.1.3.A, 1.1.6.A. After the displacement has been performed, the at least one marking point M is fixed on the corresponding cutting part outer contour 1.1.3.A, 1.1.6.A. A UV transformation UVT is determined which, from a cutting model 2.1.3, 2.1.6, generates a cutting model pattern view 3.1.3, 3.1.6 in the case of which the at least one marking point M is mapped onto the fixed position along the corresponding cutting part outer contour 1.1.3.A, 1.1.6.A.

The sequence of the first and second sub-steps S3.1, S3.2 of the third method step is repeated until a complete overlap, or at least an overlap which is adequate within inevitable manufacturing tolerances, for example during the sewing of cutting parts 1.1.1 to 1.1.7, of a cutting model pattern view 3.1.3, 3.1.6 with the corresponding cutting part 1.1.3, 1.1.6 has been achieved.

It is possible for the UV transformation UVT determined individually for each cutting model 2.1.1 to 2.1.7 in the third sub-step S3.3 to be such that, on both sides of a seam N, closely adjacent model points are mapped onto cutting drawing area points which are offset relative to one another in the seam direction. It would thus conversely be the case that design elements G which appear without an offset in the mapping of multiple cutting parts 1.1.1 to 1.1.7 onto amalgamated three-dimensional cutting models 2.1.1 to 2.1.7 would, in the actual physical arrangement, in other words during the sewing of said cutting parts 1.1.1 to 1.1.7, have an offset along a connecting seam N.

To avoid such an offset, a connection or coordination of the individual UV transformation UVT for cutting models 2.1.1 to 2.1.7 connected by way of a seam N is necessary. For this purpose, as shown in detail in FIG. 6, at least one marking point M is, in at least one of the cutting model pattern views 3.1.5, 3.1.6, applied correspondingly to adjacent cutting parts 1.1.5, 1.1.6 on one side or on both sides of a seam N or at a sewing marking N.M. Furthermore, said adjacent cutting parts 1.1.5, 1.1.6 with the applied sewing markings N.M are, correspondingly to the determined UV transformation UVT, mapped onto the surface of the corresponding cutting model pattern views 3.1.5, 3.1.6.

Here, firstly, an offset in the seam direction between the position of sewing markings N.M on a first cutting model 2.1.6 relative to corresponding oppositely situated sewing markings N.M on the second cutting model 2.1.5 situated opposite along a seam N is possible.

Such an offset is eliminated by virtue of the at least one marking point M applied in the cutting model pattern views 3.1.5, 3.1.6 around the sewing markings N.M being displaced along the seam N, in the direction opposite to the offset, to a new position in each case. For each of the connected cutting models 2.1.5, 2.1.6, a UV transformation UVT is then determined which assigns a marking point M the respectively new position. By way of the newly determined UV transformation UVT, model points (XYZ coordinates) are newly mapped onto cutting drawing area point coordinates (UV coordinates), and thus the adjacent cutting parts 1.1.5, 1.1.6 with the applied sewing markings N.M are newly mapped onto the surface of the corresponding cutting model pattern views 3.1.5, 3.1.6 with reduced offset between oppositely situated sewing markings. Through repeated displacement of in each case at least one marking point M in at least one of the adjacent cutting model pattern views 3.1.5, 3.1.6 and subsequent determination of the UV transformations (UV generations) for said cutting model pattern views 3.1.5, 3.1.6, the remaining offset is reduced to such an extent that all sewing markings N.M which are situated opposite one another on both sides of the connecting seam N are at least approximately in alignment.

Figure 7:
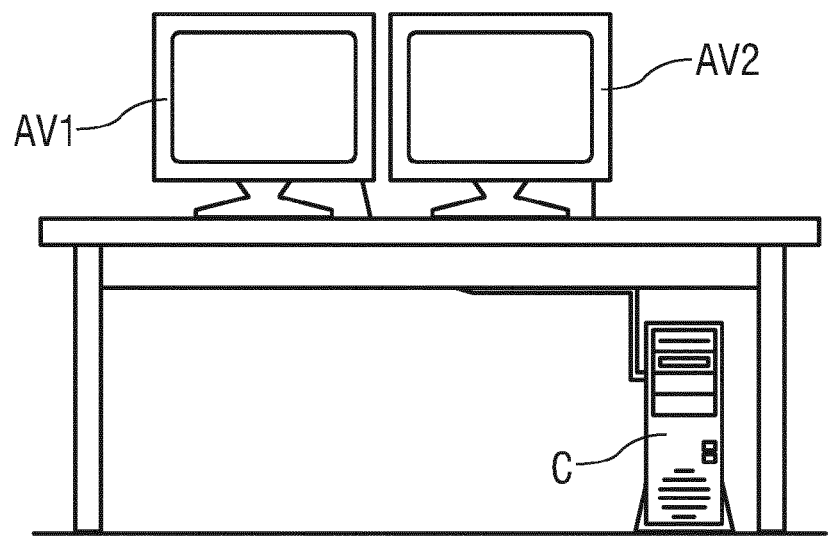
FIG. 7 is a schematic view showing two display devices for carrying out the method according to the invention.

FIG. 7 schematically shows a first display device AV1 and a second display device AV2 for the execution of the method according to the invention. The display devices AV1, AV2 may be in the form of monitors, and are controlled by a processing device C, which may for example be in the form of a computer, which has for example at least two graphics cards with in each case one graphics output, or one dual-head graphics card with two graphics outputs.

On the computer C, a CAD tool CAD for computer-aided design (CAD), a drawing tool ZW for drawing, preferably for creating graphical design elements G, and a texture display tool TW are executed as data-processing programs. By way of the CAD tool CAD, a three-dimensional seat cover model 2, composed of cover part models 2.1 to 2.4 with cutting models 2.1.1 to 2.1.7, is displayed on the first display device AV1. By way of the drawing tool ZW, the cutting parts 1.1.1 to 1.1.7 corresponding to the seat cover model 2 are displayed, and provided with design elements G, on cutting drawing areas Z1, Z4 which are arranged on the second display device AV2. By way of the texture display tool TW, design elements G of the cutting parts 1.1.1 to 1.1.7 are transferred to the corresponding cutting models 2.1.1 to 2.1.7 and are displayed by way of the CAD tool CAD on the first display device AV1.

With the two display devices AV1, AV2, it is advantageously possible for design elements G to be applied to cutting parts 1.1.1 to 1.1.7, and it is instantaneously possible, in particular without a changeover to a different data processing program, for the arrangement and the design effect of the design elements G on the three-dimensional seat cover model 2 to be followed and evaluated.

While specific embodiments of the invention have been shown and described in detail to illustrate the application of the principles of the invention, it will be understood that the invention may be embodied otherwise without departing from such principles.

The invention claimed is:

1. A method for arranging graphical design elements on a seat cover of a vehicle seat, the method comprising the steps of:
   determining a three-dimensional seat cover model of a two-dimensional seat cover of a real vehicle seat;
   UV mapping the three-dimensional seat cover model by way of a UV transformation into a two-dimensional cutting model pattern view in which two-dimensional design elements are created; and
   outputting the created design elements in the three-dimensional seat cover model, wherein:
   the three-dimensional seat cover model is created with at least two three-dimensional cutting models connected by way of at least one seam, and the three-dimensional seat cover model is visualized by way of a computer-aided design tool;
   cutting parts, which correspond to the at least two cutting models, are arranged in at least one cutting drawing area which is displayed in a predetermined display form on a cutting drawing area output region of an output unit by way of a drawing tool;
   at least one UV transformation is created for mapping of three-dimensional model point coordinates of at least one of the at least two three-dimensional cutting models onto two-dimensional cutting drawing area point coordinates of the two-dimensional cutting model pattern view which, in a pattern outer contour, substantially coincides with a cutting part outer contour of a corresponding cutting part;
   at least one cutting drawing area output region is assigned to a display of textures on the three-dimensional seat cover model by way of a texture display tool, which is connected to the computer-aided design tool, for a transfer of textures from a predetermined monitor region;
   at least one graphical design element is created and positioned by way of the drawing tool on at least one cutting part, wherein, by way of the texture display tool connected to the computer-aided design tool, a mapping of the graphical design element in accordance with the UV transformation of the corresponding cutting model is displayed on the three-dimensional seat cover model;
   for at least one three-dimensional cutting model, creating a first of the two-dimensional cutting model pattern views by way of the UV transformation;
   the pattern outer contour of the cutting model pattern view is adapted to the cutting part outer contour of the corresponding cutting part by displacement of at least one marking point;
   parameters of the UV transformation and thus the pattern outer contour of the cutting model pattern view are adapted to the displacement of the at least one marking point;
   adapting of the pattern outer contour of the cutting model pattern view to the cutting part outer contour of the corresponding cutting part and adapting of the pattern outer contour of the cutting model pattern view to the displacement of the at least one marking point are repeated until a deviation of the pattern outer contour of the cutting model pattern view from the cutting part outer contour of the corresponding cutting part falls below a predetermined deviation value; and
   visible sewing markings on cutting parts on both sides of a connecting seam are brought approximately into alignment along an alignment direction perpendicular to the seam direction.

2. The method as claimed in claim 1, wherein the three-dimensional seat cover model is created by sampling of a surface of a vehicle seat lined with a seat cover and sampling of at least one seam and is subsequently divided up along the at least one seam into the three-dimensional cutting models.

3. The method as claimed in claim 1, wherein the seat cover comprises cover parts comprising an inner backrest cover, a seat cushion cover, an outer backrest cover and a headrest cover, wherein the cutting parts each respectively assigned to one of the cover parts, are arranged on a respective cutting drawing area.

4. The method as claimed in claim 1, wherein the cutting parts are mapped onto the at least one cutting drawing area on a mapping scale of 1:1.

5. The method as claimed in claim 4, wherein at least one cutting drawing area is square and has an edge length of 4096 pixels.

6. The method as claimed in claim 1, wherein the cutting parts are displayed so as to be arranged symmetrically on at least one cutting drawing area.

7. A device for an arrangement of graphical design elements on a seat cover of a vehicle seat, the device comprising:
   a processing unit; and
   at least one display device connected to the processing unit, wherein the processing unit is, by way of at least one data processing program, formed as a computer-aided design tool, as a drawing tool and as a texture display tool, and the texture display tool is configured to transfer two-dimensional design elements, created by way of the drawing tool, into the computer-aided design tool, and to provide a visualization of a three-dimensional seat cover model and of the two-dimensional design elements in the three-dimensional seat cover model on the at least one display device, wherein the processing unit is configured to:

create a first of at least a plurality of two-dimensional cutting model pattern views by way of an UV transformation for at least one three-dimensional cutting model;

adapt a pattern outer contour of the cutting model pattern view to a cutting part outer contour of a corresponding cutting part by displacement of at least one marking point;

adapt parameters of the UV transformation and thus the pattern outer contour of the cutting model pattern view to displacement of the at least one marking point;

repeat adapting the pattern outer contour of the cutting model pattern view to the cutting part outer contour of the corresponding cutting part and adapting the pattern outer contour of the cutting model pattern view to the displacement of the at least one marking point until a deviation of the pattern outer contour of the cutting model pattern view from the cutting part outer contour of the corresponding cutting part falls below a predetermined deviation value; and bring visible sewing markings on cutting parts on both sides of a connecting seam approximately into alignment along an alignment direction perpendicular to the seam direction.

8. A device according to claim 7, wherein the processing unit is configured to:

determine the three-dimensional seat cover model of the seat cover;

UV map the three-dimensional seat cover model by way of the UV transformation into a two-dimensional cutting model pattern view in which the two-dimensional design elements are created; and output the two-dimensional design elements in the three-dimensional seat cover model.

9. A method for arranging graphical design elements on a seat cover of a vehicle seat, the method comprising the steps of:

determining a three-dimensional seat cover model of a two-dimensional seat cover of a real vehicle seat;

UV mapping the three-dimensional seat cover model by way of a UV transformation into a two-dimensional cutting model pattern view in which two-dimensional design elements are created; and outputting the two-dimensional design elements in the three-dimensional seat cover model, wherein:

for at least one three-dimensional cutting model, creating at least the two-dimensional cutting model pattern view by way of the UV transformation;

a pattern outer contour of a cutting model pattern view is adapted to a cutting part outer contour of a corresponding cutting part by displacement of at least one marking point;

parameters of the UV transformation and thus the pattern outer contour of the cutting model pattern view are adapted to the displacement of the at least one marking point;

the adapting of the pattern outer contour of the cutting model pattern view to the cutting part outer contour of the corresponding cutting part and the adapting of the pattern outer contour of the cutting model pattern view to the displacement of the at least one marking point are repeated until a deviation of the pattern outer contour of the cutting model pattern view from the cutting part outer contour of the corresponding cutting part falls below a predetermined deviation value; and visible sewing markings on cutting parts on both sides of a connecting seam are brought approximately into alignment along an alignment direction perpendicular to a seam direction.

* * * * *